US008806356B2

(12) United States Patent  
McCormack et al.

(10) Patent No.: US 8,806,356 B2
(45) Date of Patent: Aug. 12, 2014

(54) COLLABORATION MANAGEMENT TOOLS FOR CONTACT CENTERS

(75) Inventors: Tony McCormack, Galway (IE); Neil O'Connor, Galway (IE); John Yoakum, Cary, NC (US)

(73) Assignee: Avaya Inc., Basking Ridge, NJ (US)

( * ) Notice: Subject to any disclaimer, the term of this patent is extended or adjusted under 35 U.S.C. 154(b) by 287 days.

(21) Appl. No.: 13/282,733

(22) Filed: Oct. 27, 2011

(65) Prior Publication Data

US 2013/0111357 A1    May 2, 2013

(51) Int. Cl.
     *G06F 15/00*      (2006.01)
     *G06F 13/00*      (2006.01)
     *G06Q 10/10*      (2012.01)
     *G06Q 10/06*      (2012.01)

(52) U.S. Cl.
     CPC ............. *G06Q 10/109* (2013.01); *G06Q 10/06* (2013.01)
     USPC .......................................... 715/753; 715/738

(58) Field of Classification Search
     CPC ............................. G06Q 10/109; G06Q 10/06
     USPC ................. 715/751–753, 851–853, 763–765, 715/736–740
     See application file for complete search history.

(56) References Cited

U.S. PATENT DOCUMENTS

| 2004/0015821 A1* | 1/2004 | Lu et al. ........................ 717/103 |
| 2012/0030292 A1* | 2/2012 | John et al. ..................... 709/206 |
| 2012/0254419 A1* | 10/2012 | Gilzean et al. ................ 709/224 |

* cited by examiner

*Primary Examiner* — Kevin Nguyen
(74) *Attorney, Agent, or Firm* — Maldjian Law Group LLC; John Maldjian; Alexander D. Walter

(57) ABSTRACT

A method of managing the operation of a contact center comprises monitoring events occurring in the operation of a contact center and maintaining a set of trigger conditions against which monitored events may be matched. A rule set defines, for at least one trigger condition, the identity of one or more users to be contacted when the trigger condition is matched. Upon determining a match between one or more monitored events and one or more trigger conditions, the identity of one or more users associated in the rule set with the matched trigger condition(s) is retrieved from the rule set. The identified users are sent a communication including details permitting the users to access a common collaborative meeting environment.

16 Claims, 3 Drawing Sheets

COLLABORATION MANAGEMENT TOOLS FOR CONTACT CENTERS

BACKGROUND

1. Field of the Invention

This invention relates to the management of contact centers and in particular to the provision of methods and systems for collaboration in the management of such contact centers.

2. Description of Related Art

Contact centers are complex systems in which human contact center agents, external customers, supervisors and business managers interact with communications systems (such as voice and video interactive communications systems), automated applications (such as interactive voice response (IVR) and media servers), and systems for managing the operation of the contact center itself (such as queue allocation mechanisms, skillset matching mechanisms, agent resource deployment mechanisms, supervisor configuration tools, and so on).

Supervisors of contact centers are employed to allocate resources in the most efficient manner possible, depending on current demands, which can mean reallocating agents between queues, drafting in additional resources (including adding entire additional contact centers to a network of such centers), and changing operational variables such that customers are directed to different queues. In order to achieve these goals, supervisors are typically provided with desktop applications which provide access to the functions of the contact center and allow them to alter the operation of the various systems which control the operation of the contact center.

A difficulty arises where different supervisors are attempting to solve either the same or different problems in their own areas of responsibility. Due to the interaction between all of the contact center resources and systems, the actions of individual supervisors may be uncoordinated and may not result in optimal performance over the contact center.

A further shortcoming of current methods of managing the operation of contact centers arises from the fact that supervisors may not have available to them all of the information, or indeed all of the knowledge and skills, relevant to a particular situation. For example, changes to agent allocations may require cooperation with human resources or personnel departments. Changes in contact center loads may be anticipated or managed better with the benefit of input from business managers or marketing departments who will be aware of reasons for increased or decreased activity, allowing supervisors to make better decisions.

SUMMARY

Embodiments of the present invention provides a method of managing the operation of a contact center, comprising:
 a) monitoring events occurring in the operation of a contact center;
 b) maintaining a set of trigger conditions against which monitored events may be matched;
 c) maintaining a rule set defining, for at least one trigger condition, the identity of one or more users to be contacted when said trigger condition is matched;
 d) upon determining a match between one or more monitored events and one or more trigger conditions, retrieving from the rule set the identity of one or more users associated in the rule set with the matched trigger condition(s); and
 e) sending to said one or more identified users a communication including details permitting said users to access a common collaborative meeting environment.

The method enables the definition, in advance, of trigger conditions that are deemed to require the input of specified users. When those trigger conditions are met, the users are automatically identified from the rule set, contacted and invited to join a collaborative meeting space or environment. Within the meeting space, tools may be made available to enable the users to individually or collectively modify the operation of the contact center in consultation with one another. The collaborative meeting space thereby acts as a sort of "war room" that is specifically designed for and populated with the users who have been deemed in advance as an optimal team to address the trigger conditions which have been detected.

In another embodiment of the present invention, the method comprises:
 generating said collaborative meeting environment within which said users are provided with access to information relating to the operation of said contact center and are provided with access to configuration tools modifying the operation of the contact center.

The rule set may specify, for different trigger conditions, the appropriate information feeds from contact center systems and ancillary systems (e.g. sales and accounts software), and the appropriate configuration tools required to deal with the situation which has been detected in the trigger condition(s).

The method is computer-implemented and is typically embodied in a suitably programmed computer system which thereby provides a novel apparatus for carrying out the method of the invention. The computer system may be stand-alone or embodied in a network of computing devices, and may employ purpose built computing systems or general purpose computers which have been configured to operate according to the method of invention by software written for that purpose.

In one embodiment, the monitoring of events occurring in the operation of a contact center is achieved by receiving at an input of the computing system an indication of events from one or more of the contact center components.

The step of maintaining a set of trigger conditions, in one embodiment, is implemented by storing, in a storage area of the computer system, a definition of the trigger conditions against which the monitored events can be matched.

Similarly the rule set is typically stored in the same or a different storage area of the computer system.

Preferably, the step of determining a match between one or more monitored events and one or more trigger conditions is performed by a processor of the computing system. The processor then accesses from the storage area the relevant identity of one or more users from the rule set.

The collaborative meeting space may be hosted on the same or a different computing system, and may be hosted using purpose-built software or by adapting commercially available collaboration tools. A particularly preferred collaborative meeting space is generated using the FLARE collaboration software and/or the WEB.ALIVE technology, both produced by Avaya Inc. of Basking Ridge, N.J. (both FLARE and WEB.ALIVE are trademarks of Avaya Inc.)

The step of generating said collaborative meeting environment may thus comprise issuing a command to a dedicated external system hosting collaboration software, to cause that software to implement the meeting space and make it available to the users.

The step of sending a communication to users will typically involve providing at an output of the computing system a communication addressed to those users, or providing at an output of the computing system an instruction to a separate communications system enabling that communications system to issue the necessary invitations.

The step of generating a collaborative environment preferably also comprises instructing one or more applications hosted at the contact center to feed into the collaborative environment information indicative of the state of one or more contact center components.

The step of generating a collaborative environment further preferably comprises instructing one or more applications hosted at the contact center to accept commands issued by users within the collaborative environment such that said users may modify the operation of said one or more applications.

Preferably, identifying the one or more users comprises associating one or more user roles with the trigger conditions in the rules set and upon determining a match between one or more monitored events and one or more trigger conditions, identifying available users having said roles associated with said matched trigger conditions.

Preferably, the method responds to abnormal events occurring within the contact center.

The invention also provides a computer readable code stored on a computer-readable non-transitory computer medium which when executed on a computing device is arranged to perform the steps of the above method.

There is also provided a system for managing a contact center comprising a processor adapted to:
a) monitor events occurring in the operation of a contact center;
b) maintain a set of trigger conditions against which monitored events may be matched;
c) maintain a rule set defining, for at least one trigger condition, the identity of one or more users to be contacted when said trigger condition is matched;
d) upon determining a match between one or more monitored events and one or more trigger conditions, retrieve from the rule set the identity of one or more users associated in the rule set with the matched trigger condition(s); and
e) send to said one or more identified users a communication including details permitting said users to access a common collaborative meeting environment.

DETAILED DESCRIPTION

Figure 1:
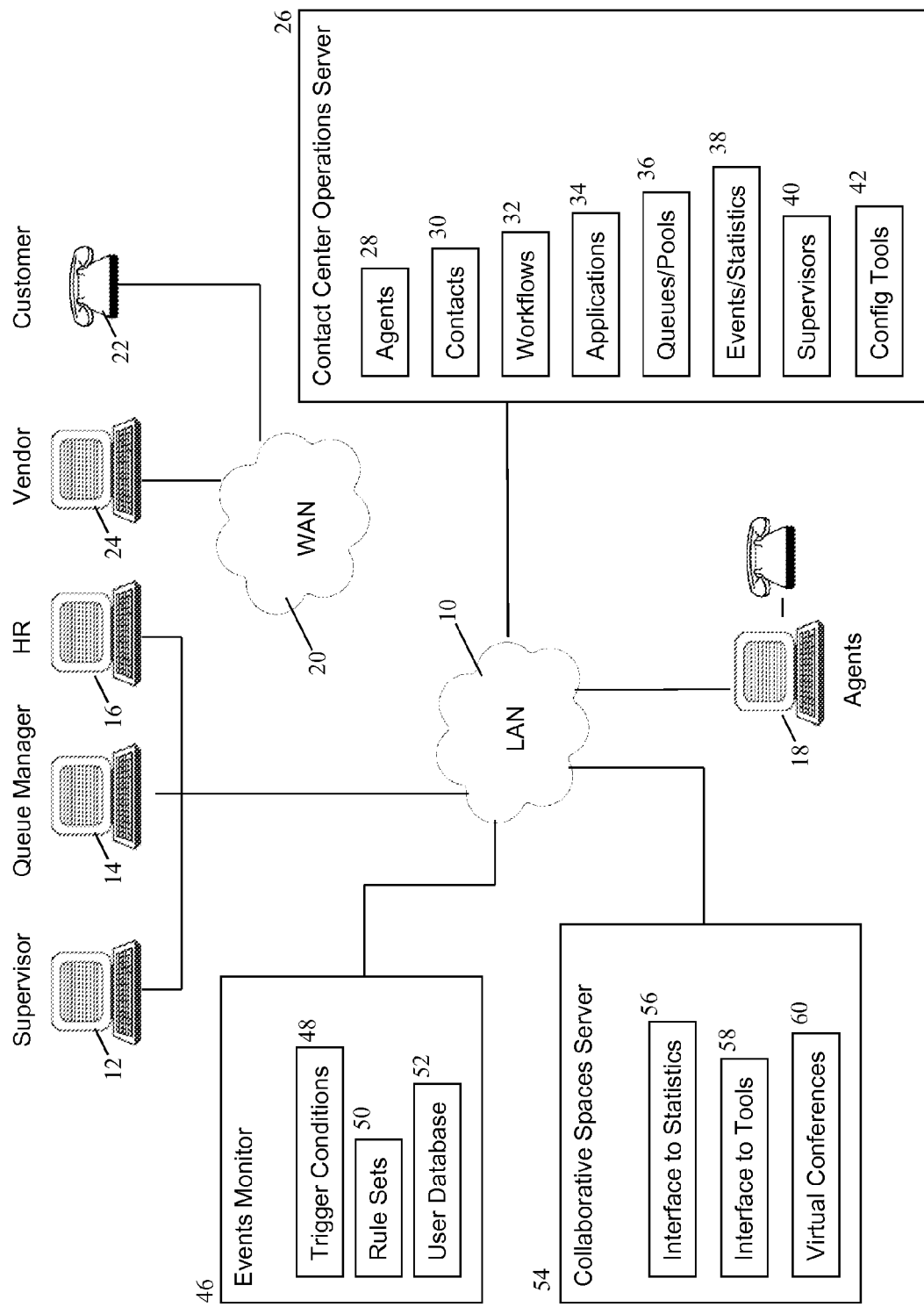
FIG. 1 is a block diagram architecture of a contact center environment.

In FIG. 1 there is shown a block diagram architecture of a contact center environment. The contact center environment includes a local area network (LAN) 10 providing communication between employees and operatives of the contact center. Representative roles of such employees (of which there will typically be many of each kind), include a supervisor 12, a queue manager 14, a human recourses manager 16 and a contact center agent 18. The LAN 10 is in communication with external parties via conventional gateways and telecommunication technology (not shown) which connects to a wide area network (WAN) 20 such as the Internet or the public switched telephone network (PSTN). In this way, customers 22 may connect to the contact center in known manner, as may external suppliers and service providers such as a vendor 24.

The contact center operates in known manner for its day-to-day operations, employing conventional contact center technology represented in FIG. 1 by a contact center operations server 26. The operations server 26 runs software which manages the agent resources available to the contact center 28, which includes records, settings and allocations for the individual agents 18 at their workstations or telephone sets. The contact center operations server 26 also manages the routing of individual contacts 30 such as call, emails, instant messages and so on, as they are routed between the various communications systems and personnel of the contact center. This management is conducted in accordance with stored workflow routines 32, which will typically specify how a contact is handled from the time it is initiated (whether by the customer 22, the agent 18, or an automated system of the contact center) and will typically involve treatment of the contact by one or more automated applications 34, such as interactive voice response applications, recorded announcement applications, music on hold servers, and so on.

The allocation of contacts to agents is typically performed by placing the contact into a queue or a pool 36, from which agents are served or agents may select appropriate contacts according to predefined rules or the preferences of the individuals concerned. The contact center operations server 26 also provides a facility for monitoring events occurring in the contact center, recording them for future reference and for regulatory reasons, and for generating statistics relating to current, historic and predicted future performance, as represented at 38. The server further maintains a representation of the supervisors 12 of the contact center in a supervisors' application 40 which defines access rights, abilities, access to tools, areas of responsibility, and so on. Finally, in this simplified representation of the contact center operations server, various configuration tools 42 are provided allowing all adjustable setting of the contact center to be varied in accordance with prescribed parameters. Such configuration tools may be made available to appropriate personnel and systems of the contact center, including the supervisors 12, the agents 18, the vendors 24 and so on, as well as by the applications 34.

As thus far described in overview, the contact center is conventional. The skilled person will be familiar with the implementation of the various entities as described above.

There is also provided an events monitor system 46 which communicates with the events/statistics function 38 of the contact center operation server to receive a feed of defined events and/or statistics. Within the events monitoring system 46, there is a storage area containing definitions of trigger conditions 48 against which events or statistics may be matched, either individually, or as a number of events occur simultaneously or in succession, or as a aggregation of various events. Examples of events that might cause a match with a trigger condition would include an increase or decrease in the overall contact center activity or in the activity of contact of a particular type or of a particular skill set; an increase or decrease in sales figures, hold times, call abandon rates, busy or idle agent numbers, available bandwidth or telecommunications access; or indications of various anomalous event such as a software crash or overload, a hardware failure, a telecommunications failure, a shortage or oversupply of rostered agents; a prediction based on current or historical events, such as a recognition that support calls for a particular product or service are showing an increase or are likely to increase based on historical trends, an example being a recognition that a period of intense insurance sales occurred almost twelve months ago, such that a spike in renewal calls is to be expected in the near future.

The events monitoring system 46 also includes a storage area containing defined rule sets 50 which correlate one or more trigger conditions with one or more groups of users to be contacted, specified either on an individual basis or a role basis (i.e., a rule might specify that Jane Doe is to contacted where an increased number of agents are likely to be required, or it might specify that the on-duty roster supervisor is to be contacted). Typically, the rule sets 50 will specify one or more predefined teams, which may be thought of as crisis response teams, optimised to deal with specific trigger conditions 48.

In addition, the events monitoring system 46 contains a user database 52 from which contact details for the specified users identified in the rules sets 50 can be accessed.

A collaborative spaces server 54 is also provided at the contact center. This collaborative spaces server, in the illustrated embodiment, is a WEB.ALIVE 2.0 server capable of hosting a plurality of virtual environments into which users may be connected using whatever communications ability is currently available to each user (i.e., some users may simply have an audio connection from a telephone, others may have video conferencing, and yet others may have more immersive virtual reality clients which connect into the WEB.ALIVE environment. Each WEB.ALIVE environment is similar in nature to the massively multiplayer online virtual world known as "Second Life" ("Second Life" is a trademark of Linden Research, Inc.) WEB.ALIVE enable corporate users to build customised environments within which users may collaborate on documents, displays, spreadsheets, interactive tools, and so on.

Accordingly, the collaborative spaces server 54 provides an interface to statistics 56 which communicates with the events/statistics subsystem 38 of the contact center operations server 26, and an interface to tools 60 which interfaces with the configuration tools 42 of the contact center operations server 26.

Thus, the collaborative spaces server 54 hosts one or more virtual conferences 60 and each virtual conference 60 can receive events and statistics which are converted for display in any desired manner within the virtual world by the statistics interface 56. Similarly, controls can be provided within a virtual conference 60 which are activated and interpreted by the interfaced tools 58 in order to control the configuration tools of any appropriate contact center system.

The operation of the contact center, and more particularly of the events monitor 46 and collaborative spaces server 54 will be described further with reference to FIGS. 2 and 3.

Figure 2:
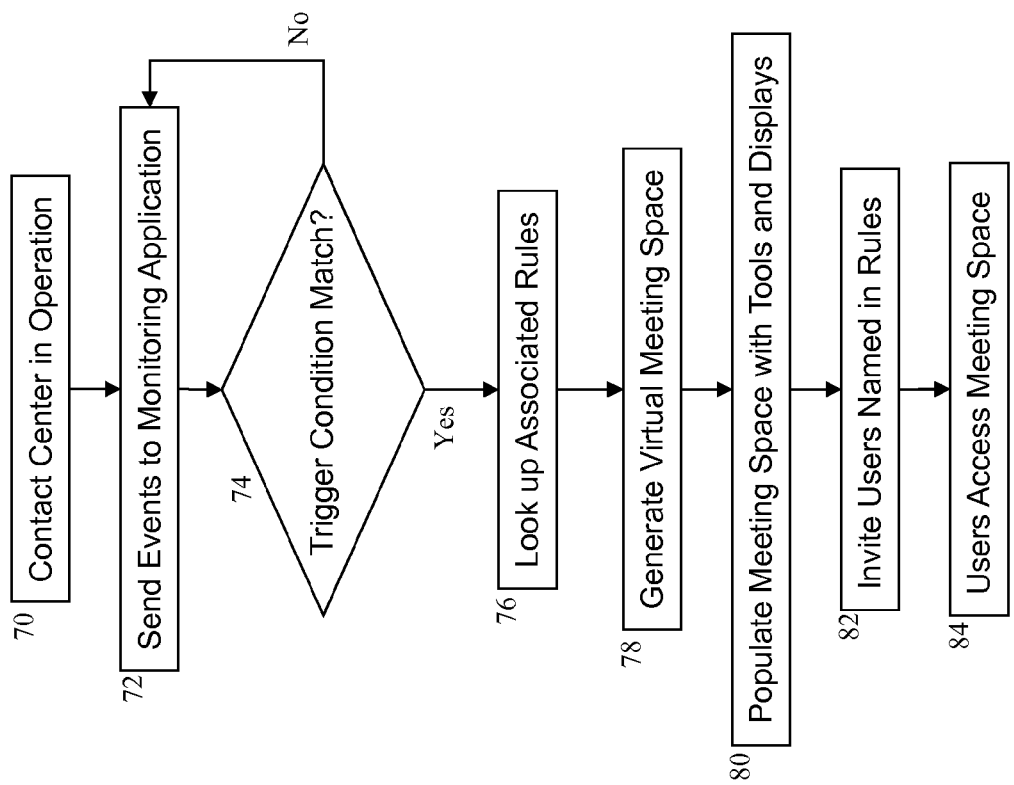
FIG. 2 is a flowchart detailing the operation of software implementing a method of managing the operation of a contact center.

In FIG. 2, step 70, the contact center is in operation. The events/statistics subsystem 38 sends events of predefined types and predefined formats to the events monitor 46, step 72. When and event is received, or when a defined number of events have accumulated, a check is made, step 74, to see if a trigger condition 48 has been matched. If not, the process reverts to step 72. If, However, a trigger condition match is found, the events monitoring system looks up the rule sets 50 to find the rule or rules associated with the particular trigger conditions for which a match has been found, step 76.

Assuming that there is a match in a rule set, this indicates that users are to be gathered together in a virtual conference on collaborative spaces server 54. Accordingly, a command is issued to collaborative spaces server 54 to generate a virtual meeting space in order that the users may convene to deal with whatever events have matched the trigger conditions, step 78. The collaborative spaces server generates a virtual conference 60, and populates display and controls within that space with appropriate tools and displays, step 80, using the interface statistics to populate the displays and the interface tools to configure the operation of tool controls within the virtual meeting space. The tools and displays chosen for any particular collaborative environment generated within collaborative spaces server 54 can be a default set, such as the most commonly used statistical matrix for the contact center and the most commonly requested or used configuration tools. Alternatively, or additionally, the rule sets 50 may specify, for particular trigger conditions, a custom set of tools and displays required to handle the occurrence defined by the trigger condition.

In step 82, the events monitoring system 46 consults the user database 52 to determine contact details for each user specified in the rule set as being associated with the trigger condition matched. The user database may record a SIP address, telephone number, URI, or any other contact means in order to alert the user that his or her presence is required. Invitations are sent either by the events monitoring system 46 directly, if it has appropriate messaging capabilities, or by passing invitation details to a dedicated communications system which can issue events via the LAN 10 and/or WAN 20 to the specified users.

A typical invitation will be configured so that a user may interact with it, for example an instant message containing a link or URI which may be clicked in order to launch a client interface, the link or URI containing the address of the virtual conference 60 on the collaborative spaces server 54. The exact mechanism of the invitation and response is at the choice of the system designer.

In step 84, users respond to the invitation and thereby access the meeting space, following which they are placed in a multi-user collaborative environment with one another, with access (according to the abilities of the client which is being used by each user) to the displays and tools of the collaborative spaces server. The users are thus gathered together automatically in the optimal team in a collaboration and are provided with the information and tools necessary to deal with whatever situation has manifested itself in the trigger conditions which have been matched by the vents monitoring system 46.

Figure 3:
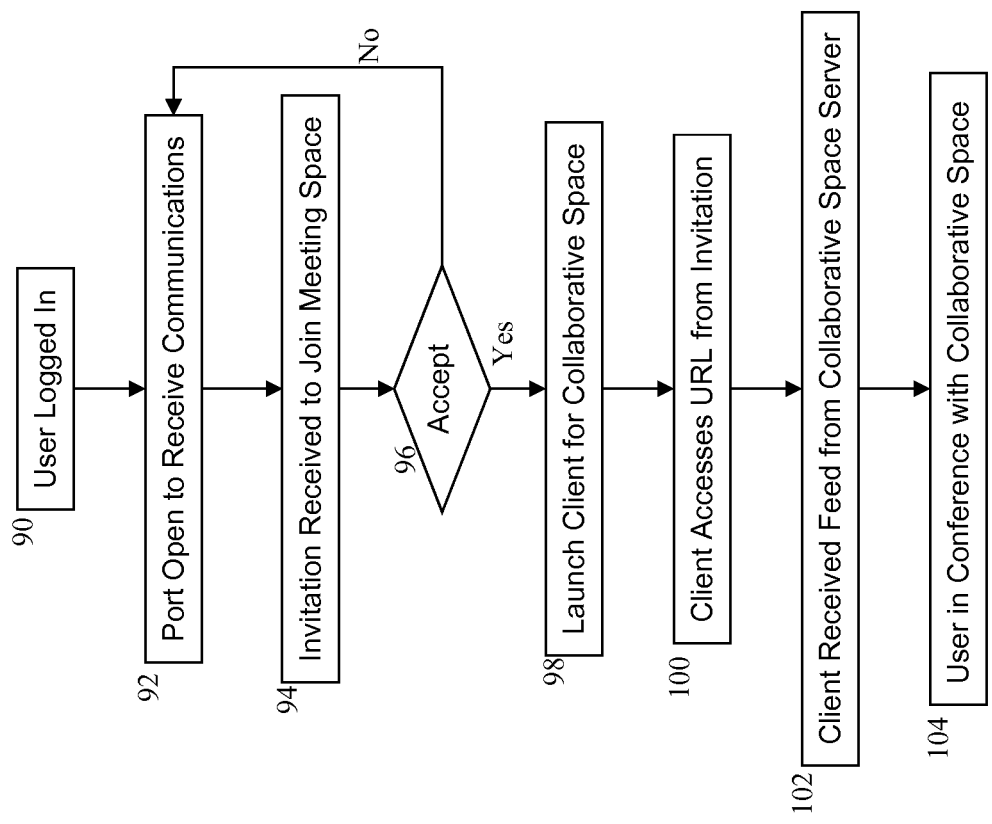
FIG. 3 is a flowchart detailing the operation of software on a client device interacting with the software detailed in FIG. 2.

Referring now to FIG. 3, the process is shown from the point of view of one of the users who is summoned or invited to a collaborative environment in the circumstances described in relation to FIG. 2.

In step 90, the user is logged in to an appropriate communications system. A port is opened on that system to receive invitations, i.e. the user will typically have a device which is "listening" for invitations or which periodically polls for invitations or which has an open port via which an invitation can be pushed to the user).

In step 94, an invitation is received to join a collaborative meeting space, i.e. in response to an invitation issued in step 82, FIG. 2. In the embodiment illustrated in FIG. 3, the user is provided with the option to accept or reject the invitation, decision 96. This again is at the option of the system designer. It may be the case that for critical situations or critical users, there is no option to refuse an invitation or they are not required to confirm but are simply summoned automatically and put into communication with the virtual environment automatically upon receiving the invitation. However, the illustrated embodiment of FIG. 3 allows the user to make the decision to accept the invitation, and assuming they do accept in decision 96, they manually or automatically launch a client having communications capabilities and an interface into the collaborative space. As described above, typically the invitation will include a clickable link or interactive code allowing the user to accept and thereby trigger the launch of a client on a user device in step 98. The client software, step 100, accesses a URL or URI from the invitation or in some other way is provided with the network address (for example it might be pre-programmed into the device as a static address). A communications channel is opened to the collaborative communications server and in step 102, the client receives a feed of data, which may be audio, video or of any other media type, for display to the user. From that point on, as indicated in step 104, the user is in conference with the collaborative space and thereby with all other users who have accepted invitations that collaborative space.

Variations on the described system may be envisaged. For example, users may pass on invitations to more appropriate personnel, and the events monitoring system may be programmed to invite alternative participants if a user refuses or does not respond. Rather than launching a custom virtual environment for each event, there may be permanent rooms or semi-permanent rooms which are maintained and into which users are conferenced on every occasion where the rules require their presence.

The invention is not limited to the embodiment(s) described herein but can be amended or modified without departing from the scope of the present invention.

We claim:

1. A method of managing the operation of a contact center, comprising:
   a) monitoring events occurring in the operation of a contact center;
   b) maintaining a set of trigger conditions against which monitored events are matched;
   c) maintaining a rule set defining, for at least one trigger condition, the identity of one or more users to be contacted when said trigger condition is matched;
   d) upon determining a match between one or more monitored events and one or more trigger conditions, retrieving from the rule set the identity of one or more users associated in the rule set with the matched trigger condition(s); generating a collaborative meeting environment within which said users are provided with access to information relating to the operation of said contact center, populating the collaborative meeting environment with configuration tools for modifying the operation of the contact center, and
   e) sending to said one or more identified users a communication including details permitting said users to access the common collaborative meeting environment.

2. The method according to claim 1 wherein the rule set may specify, for different trigger conditions, appropriate information feeds from contact center systems and ancillary systems, and appropriate configuration tools required to deal with the monitored event matching the trigger condition(s).

3. The method according to claim 1 wherein the monitoring of events occurring in the operation of a contact center is achieved by receiving at an input of the computing system an indication of events from one or more of the contact center components.

4. The method according to claim 1 wherein the step of maintaining a set of trigger conditions is implemented by storing, in a storage area of a computer system, a definition of the trigger conditions against which the monitored events is matched.

5. The method according to claim 4 wherein the rule set is stored in the same or a different storage area of the computer system as the set of trigger conditions.

6. The method according to claim 4 wherein, the step of determining a match between one or more monitored events and one or more trigger conditions is performed by a processor of the computing system.

7. The method according to claim 6 further comprising the processor then accessing from the storage area the relevant identity of one or more users from the rule set.

8. The method according to claim 4 comprising hosting the collaborative meeting environment on either: the same; or a different computing system.

9. The method according to claim 1 wherein said step of generating said collaborative meeting environment comprises issuing a command to a dedicated external system hosting collaboration software, to cause that software to implement the meeting space and make it available to the users.

10. The method according to claim 1 wherein said step of sending a communication to users comprises either: providing at an output of a computing system a communication addressed to those users; or providing at an output of a computing system an instruction to a separate communications system enabling that communications system to issue the necessary invitations.

11. The method according to claim 1 wherein the step of generating a collaborative environment also comprises instructing one or more applications hosted at the contact center to feed into the collaborative environment information indicative of the state of one or more contact center components.

12. The method according to claim 1 wherein the step of generating a collaborative environment comprises instructing one or more applications hosted at the contact center to accept commands issued by users within the collaborative environment such that said users may modify the operation of said one or more applications.

13. The method according to claim 1, comprising identifying the one or more users by associating one or more user roles with the trigger conditions in the rules set and upon determining a match between one or more monitored events and one or more trigger conditions, identifying available users having said roles associated with said matched trigger conditions.

14. The method according to claim 1 wherein said events comprise abnormal events.

15. A computer program product comprising computer readable code stored on a computer-readable non-transitory computer medium which when executed on a computing device is arranged to perform the steps of:
   a) monitoring events occurring in the operation of a contact center;
   b) maintaining a set of trigger conditions against which monitored events are matched;
   c) maintaining a rule set defining, for at least one trigger condition, the identity of one or more users to be contacted when said trigger condition is matched;
   d) upon determining a match between one or more monitored events and one or more trigger conditions, retrieving from the rule set the identity of one or more users associated in the rule set with the matched trigger condition(s); generate a collaborative meeting environment within which said users are provided with access to information relating to the operation of said contact center, populate the collaborative meeting environment with configuration tools for modifying the operation of the contact center, and e) sending to said one or more identified users a communication including details permitting said users to access a common collaborative meeting environment.

16. A contact center comprising a processor adapted to:

a) monitor events occurring in the operation of a contact center;

b) maintain a set of trigger conditions against which monitored events are matched;

c) maintain a rule set defining, for at least one trigger condition, the identity of one or more users to be contacted when said trigger condition is matched;

d) upon determining a match between one or more monitored events and one or more trigger conditions, retrieve from the rule set the identity of one or more users associated in the rule set with the matched trigger condition(s); generating a collaborative meeting environment within which said users are provided with access to information relating to the operation of said contact center, populating the collaborative meeting environment with configuration tools for modifying the operation of the contact center, and e) send to said one or more identified users a communication including details permitting said users to access a common collaborative meeting environment.

* * * * *